(12) United States Patent
Kawai et al.

(10) Patent No.: US 10,359,169 B2
(45) Date of Patent: Jul. 23, 2019

(54) LAMP UNIT AND VEHICLE HEADLAMP

(71) Applicant: Koito Manufacturing Co., Ltd., Tokyo (JP)

(72) Inventors: Hiroki Kawai, Shizuoka (JP); Kenta Oishi, Shizuoka (JP); Naoki Uchida, Shizuoka (JP); Hiroyuki Ishida, Shizuoka (JP); Hidetada Tanaka, Shizuoka (JP); Noriko Sato, Shizuoka (JP); Ryuho Sato, Shizuoka (JP); Takatomo Fujiyoshi, Shizuoka (JP)

(73) Assignee: KOITO MANUFACTURING CO., LTD., Takanawa, Minato-Ku, Tokyo (JP)

( * ) Notice: Subject to any disclaimer, the term of this patent is extended or adjusted under 35 U.S.C. 154(b) by 0 days.

(21) Appl. No.: 15/412,084

(22) Filed: Jan. 23, 2017

(65) Prior Publication Data

US 2017/0130924 A1    May 11, 2017

Related U.S. Application Data

(63) Continuation of application No. PCT/JP2015/070114, filed on Jul. 14, 2015.

(30) Foreign Application Priority Data

Jul. 23, 2014  (JP) .................................. 2014-150192
Jul. 23, 2014  (JP) .................................. 2014-150193
Jul. 23, 2014  (JP) .................................. 2014-150194

(51) Int. Cl.
*B60Q 1/14*  (2006.01)
*F21S 41/00*  (2018.01)
(Continued)

(52) U.S. Cl.
CPC .............. *F21S 43/00* (2018.01); *B60Q 1/143* (2013.01); *F21S 41/00* (2018.01); *F21S 41/143* (2018.01);
(Continued)

(58) Field of Classification Search
None
See application file for complete search history.

(56) References Cited

U.S. PATENT DOCUMENTS

2007/0201241 A1   8/2007  Komatsu
2012/0170300 A1   7/2012  Kathmann et al.

FOREIGN PATENT DOCUMENTS

CN   102635821 A   8/2012
CN   103765086 A   4/2014
(Continued)

OTHER PUBLICATIONS

Machine translation of JP-2012256491-A, 2012-12-27, Stanley Electric Co Ltd. (Year: 2012).*
(Continued)

*Primary Examiner* — Britt D Hanley
(74) *Attorney, Agent, or Firm* — Buchanan Ingersoll & Rooney PC

(57) ABSTRACT

A lamp unit includes a light-emitting element array composed by a plurality of light-emitting elements, having respective individual irradiation regions constituting a high-beam light-distribution pattern and configured to be capable of being turned on individually, mounted in array on a substrate, a projection lens disposed in front of the light-emitting element array, and a reflector disposed below the light-emitting element array. Inter-light-emitting-element spacing within the light-emitting element array widens the more separated the elements are from the projection lens' optical axis.

7 Claims, 13 Drawing Sheets

(51) Int. Cl.
- *F21S 41/19* (2018.01)
- *F21S 41/30* (2018.01)
- *F21S 41/32* (2018.01)
- *F21S 41/39* (2018.01)
- *F21S 41/43* (2018.01)
- *F21S 41/47* (2018.01)
- *F21S 43/00* (2018.01)
- *F21S 45/10* (2018.01)
- *F21S 45/43* (2018.01)
- *F21S 45/47* (2018.01)
- *F21S 41/143* (2018.01)
- *F21S 41/147* (2018.01)
- *F21S 41/255* (2018.01)
- *F21S 41/275* (2018.01)
- *F21S 41/663* (2018.01)
- *F21Y 103/10* (2016.01)

(52) U.S. Cl.
CPC ........... *F21S 41/147* (2018.01); *F21S 41/192* (2018.01); *F21S 41/275* (2018.01); *F21S 41/30* (2018.01); *F21S 41/321* (2018.01); *F21S 41/39* (2018.01); *F21S 41/43* (2018.01); *F21S 41/47* (2018.01); *F21S 41/663* (2018.01); *F21S 45/10* (2018.01); *B60Q 1/1423* (2013.01); *B60Q 2300/056* (2013.01); *B60Q 2300/41* (2013.01); *B60Q 2300/45* (2013.01); *F21S 41/19* (2018.01); *F21S 41/255* (2018.01); *F21S 45/43* (2018.01); *F21S 45/47* (2018.01); *F21Y 2103/10* (2016.08)

(56) References Cited

FOREIGN PATENT DOCUMENTS

| | | |
|---|---|---|
| JP | 2004-327188 A | 11/2004 |
| JP | 2007-329068 A | 12/2007 |
| JP | 2008-288113 A | 11/2008 |
| JP | 2009-179121 A | 8/2009 |
| JP | 2011-201400 A | 10/2011 |
| JP | 2012256491 A | 12/2012 |
| JP | 2013168434 A | 8/2013 |
| JP | 2013-187081 A | 9/2013 |
| JP | 2013-246888 A | 12/2013 |
| JP | 2014-067714 A | 4/2014 |

OTHER PUBLICATIONS

International Search Report from International Application No. PCT/JP2015/070114, dated Oct. 20, 2015.
International Preliminary Report on Patentability from International Application No. PCT/JP2015/070114, dated Oct. 20, 2015.
Extended European Search Report on corresponding EP Application No. 15824428.5, dated Mar. 9, 2018.
Official Action on corresponding CN Application No. 201580040256.8, dated Jul. 13, 2018.
Office Action (Notification of Reasons for Refusal) dated Mar. 26, 2019, by the Japanese Patent Office in corresponding Japanese Patent Application No. 2016-535886 and English translation of the Office Action. (11 pages).
Office Action issued in corresponding Chinese Application No. 201580040256.8 dated May 23, 2019 and English translation, 13 pages.

* cited by examiner

ENLARGED VIEW OF PORTION D

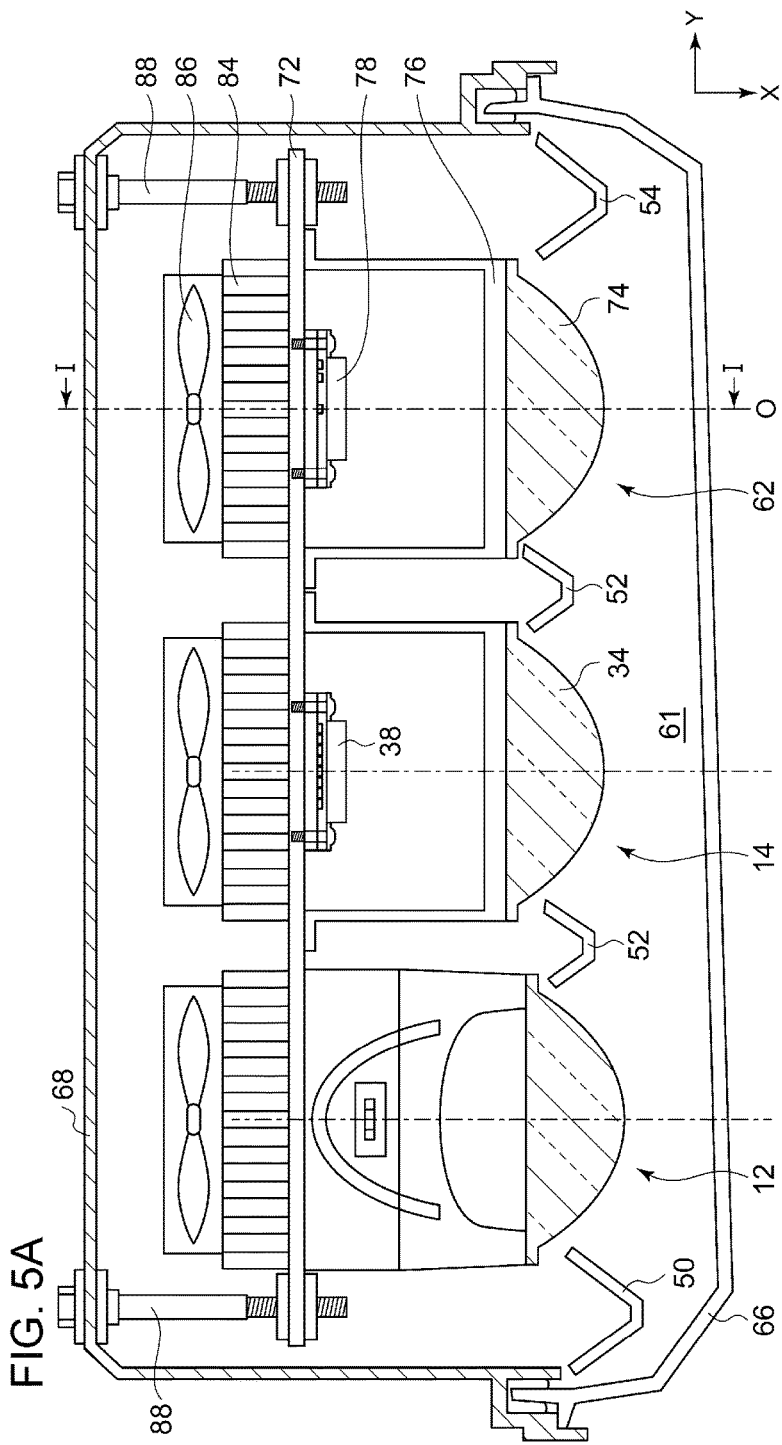
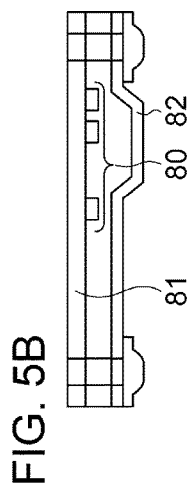
FIG. 5A
FIG. 5B

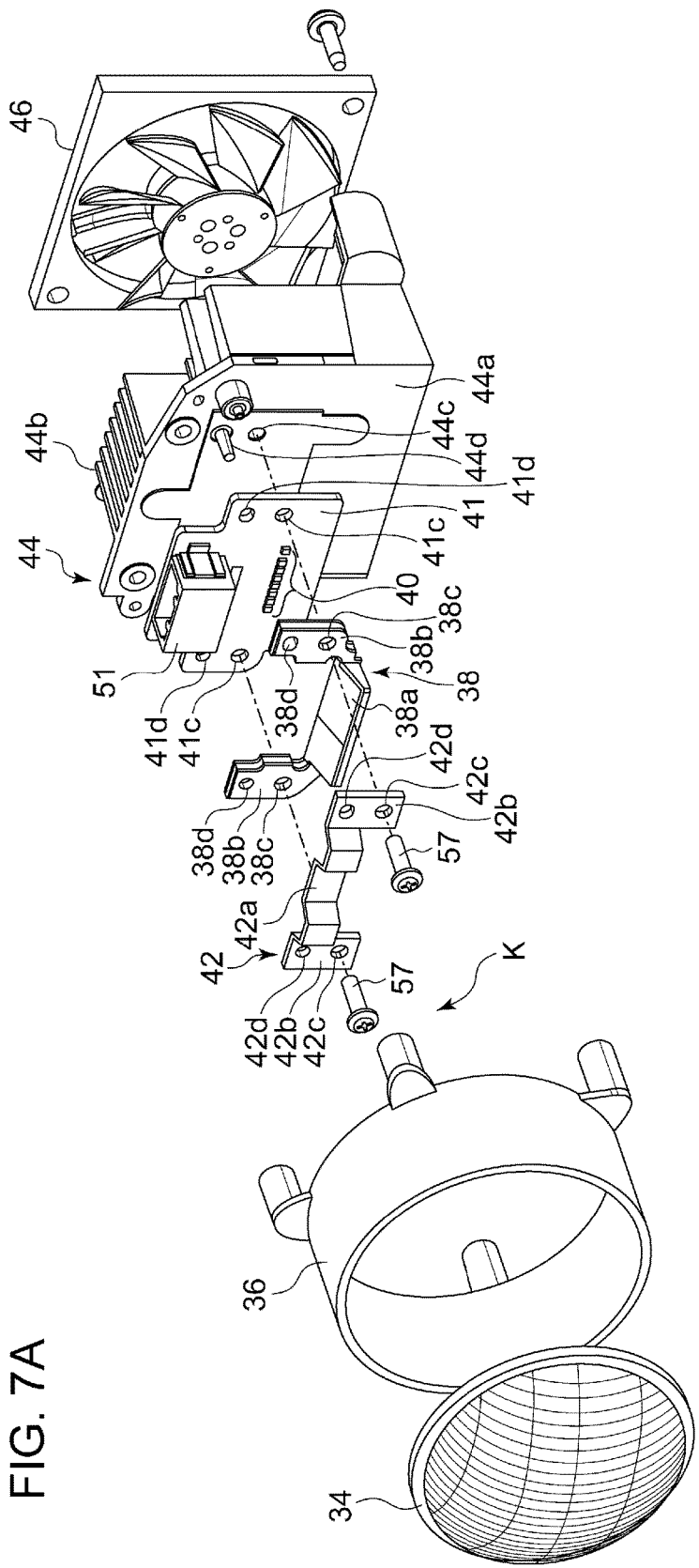
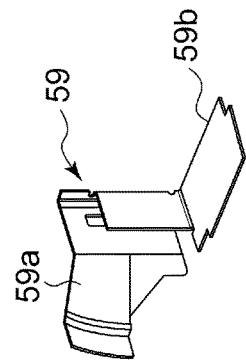
FIG. 7A
FIG. 7B

CONVEX GROOVE OR CONCAVE GROOVE

LAMP UNIT AND VEHICLE HEADLAMP

TECHNICAL FIELD

The present invention relates to lamp units and vehicle headlamps.

BACKGROUND ART

Vehicle headlamps provided with a light-emitting element array constituted by a plurality of semiconductor light-emitting elements configured to enable the array to irradiate respective individual sideways-split irradiation regions above the horizon are known. With such vehicle headlamps, the position of vehicles running ahead and of pedestrians is detected and the light-emitting element array is controlled so as not to irradiate the individual irradiation region that corresponds to the detected position, to enable realizing an adaptive driving beam (ADB) that keeps glare off the drivers of vehicles running ahead and off pedestrians. Also, vehicle headlamps that by comprising a light-emitting element array enabled for irradiating individual irradiation regions in a lattice form in which a region above the horizon is split not only sideways but also up and down into a plurality of tiers are configured to form a light-distribution pattern having an up-and-down oriented cutoff line (for example, Patent Document 1).

Patent Document 1: JP2009-179121

Problem to Be Solved by the Invention

In ADBs, it is necessary to secure long-distance visibility at the same time glare is being kept off vehicles running ahead and pedestrians. For that reason, enhancing the optical resolution of the light-distribution pattern particularly near the middle of a virtual perpendicular screen located forward of the vehicle is desirable.

An object of the present invention, brought about taking the above-discussed issues into consideration, is to make available technology for enhancing the optical resolution for high beams around the middle of their light-distribution pattern.

Means to Solve the Problem

The present invention in a certain aspect is a lamp unit that includes a light-emitting element array composed by a plurality of light-emitting elements, having respective individual irradiation regions constituting a high-beam light-distribution pattern and configured to be capable of being turned on individually, mounted in a row on a substrate, a projection lens disposed in front of the light-emitting element array, and a reflector disposed below the light-emitting element array, wherein inter-light-emitting-element spacing within the light-emitting element array widens the more separated the elements are from the projection lens' optical axis.

BRIEF DESCRIPTION OF THE DRAWINGS

FIG. 5A is a schematic sectional view of the vehicle headlamp illustrated in FIG. 4 cut along a horizontal plane passing through the E-E line; FIG. 5B is a fragmentary sectional view cut along a horizontal plane passing through the G-G line;

FIG. 7A is an exploded perspective view of a high-beam lamp unit; FIG. 7B is a shading plate made of metal;

MODE FOR CARRYING OUT THE INVENTION

Figure 1:
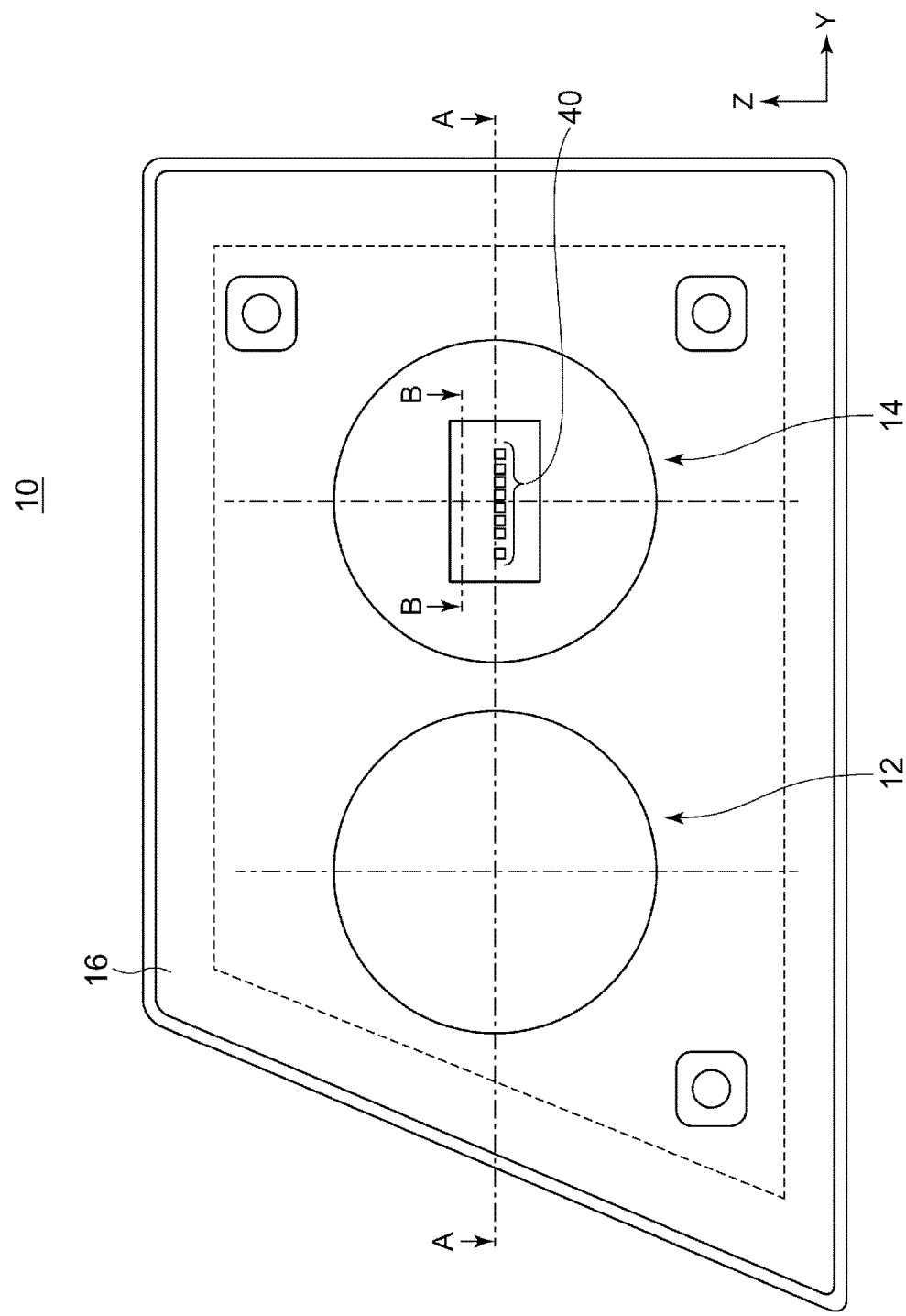
FIG. 1 is a schematic front view of a vehicle headlamp according to an embodiment of the present invention.

The present invention in a certain aspect is a lamp unit that includes a light-emitting element array composed by a plurality of light-emitting elements, having respective individual irradiation regions constituting a high-beam light-distribution pattern and configured to be capable of being turned on individually, mounted in a row on a substrate, a projection lens disposed in front of the light-emitting element array, and a reflector disposed below the light-emitting element array, wherein inter-light-emitting-element spacing within the light-emitting element array widens the more separated the elements are from the projection lens' optical axis.

According to this aspect, the interval between the light-emitting elements is smaller near the optical axis of the projection lens than at a position spaced apart from the optical axis, and thus the resolution of a high-beam light-distribution pattern around the center thereof can be increased.

The substrate of the light-emitting element array may be disposed such as to incline in a downward direction relative to the projection lens' optical axis. This reduces the amount of light beam emitted toward the outside of a line connecting the light-emitting element array and an upper end of an effective surface of the projection lens, and thus the utilization factor of the light beam can be improved.

The reflector may be disposed such as to incline in a downward direction relative to the projection lens' optical axis such that an extension line extending from a surface of the reflector toward the vehicle's front positions in the vicinity of a lower edge of an effective surface of the projection lens. This makes it possible to increase the amount of light beam incident on the effective surface of the projection lens.

The light-emitting element array may be disposed so as to align on the projection lens' virtual image surface as viewed from perpendicularly overhead. This makes it possible to prevent a light-distribution pattern formed by the projection lens from being distorted.

A shading plate disposed between the light-emitting element array and an upper edge of the projection lens may further be provided. This makes it possible to prevent an occurrence of sagging at a lower portion of a light-distribution pattern that could be caused by chromatic aberration of the projection lens.

In vehicle headlamp that includes lamp units each as above-described, provided at either of right and left sides of a vehicle-body front portion, with the light-emitting element arrays of the two lamp units, the light-emitting elements are disposed unequally sideways centering on the projection lens' optical axis, and the individual irradiation regions of the light-emitting element array of one of the lamp units and the individual irradiation regions of the light-emitting element array of the other of the lamp units partially overlap horizontally. With this configuration, by appropriately selecting the light-emitting elements to be turned on in the light-emitting element arrays of the two lamp units, the resolution of a high-beam light-distribution pattern can be improved as compared to a case in which only a single lamp unit is used.

The light-emitting element array of the one of the lamp units may include three light-emitting elements, wherein one of the light-emitting elements may be disposed on the projection lens' optical axis, and the other two of the light-emitting elements may be disposed such as to have individual irradiation regions that overlap the individual irradiation regions of light-emitting elements located at edge portions of the light-emitting element array of the other of the lamp units. This makes it possible to achieve both broad-range diffused light and far-side visibility with the use of a relatively small number of light-emitting elements.

FIG. 1 is a schematic front view of a vehicle headlamp 10 according to an embodiment of the present invention. The vehicle headlamp 10 includes a left-side lamp and a right-side lamp provided on the left and right sides, respectively, of the front portion of a vehicle body, but FIG. 1 illustrates only the right-side lamp. The left-side lamp has a configuration similar to that of the right-side lamp except that they are horizontally symmetric, and thus the depiction of the left-side lamp is omitted.

The vehicle headlamp 10 includes a lamp room 11 formed by a lamp body 18 (see FIG. 2A) having an opening toward the front of the vehicle and a transparent or semi-transparent outer cover 16 that covers the opening of the lamp body. A low-beam lamp unit 12 and a high-beam lamp unit 14 are disposed inside the lamp room 11.

Figure 2A:
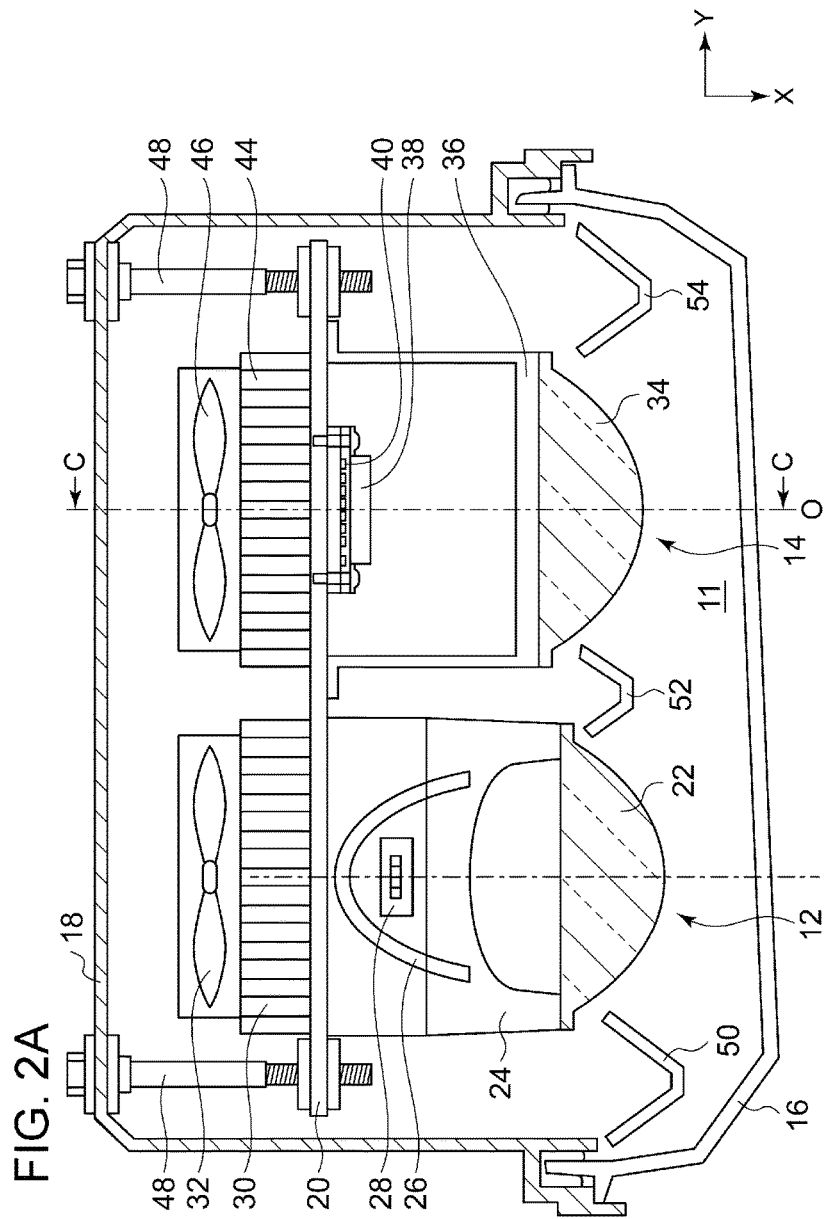
FIG. 2A is a schematic sectional view of the vehicle headlamp illustrated in FIG. 1 cut along a horizontal plane passing through the A-A line.
Figure 2B:
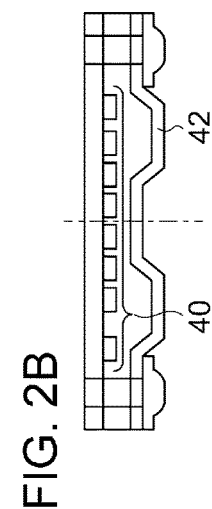
FIG. 2B is a fragmentary sectional view cut along a horizontal plane passing through the B-B line.

FIG. 2A is a schematic sectional view of the vehicle headlamp 10 illustrated in FIG. 1 cut along a horizontal plane passing through the A-A line in FIG. 1, and FIG. 2B is a fragmentary sectional view cut along a horizontal plane passing through the B-B line in FIG. 1.

The low-beam lamp unit 12 and the high-beam lamp unit 14 are fixed to a common support plate 20. The support plate 20 is fixed to the lamp body 18 with a plurality of (e.g., three) aiming screws 48. Rotating the aiming screws 48 makes it possible to achieve an optical axis adjustment of tilting the optical axes of the low-beam lamp unit 12 and of the high-beam lamp unit 14 within a predetermined angular range.

The low-beam lamp unit 12 is a so-called PES-type lamp unit and includes a projection lens 22, a lens holder 24 that supports the projection lens 22, a light-emitting element array 28 constituted by a plurality of semiconductor light-emitting elements such as light-emitting diodes (LEDs), and a reflector 26 that reflects light from the light-emitting element array 28 toward the projection lens 22, and these components are provided to the front side of the support plate 20. The low-beam lamp unit 12 further includes a heat sink 30 provided with a heat-dissipating fin attached to the back surface side of the support plate 20 and a cooling fan 32. The structure of such a PES-type lamp unit is well known, and thus more detailed descriptions thereof will be omitted in the present specification.

Figure 3A:
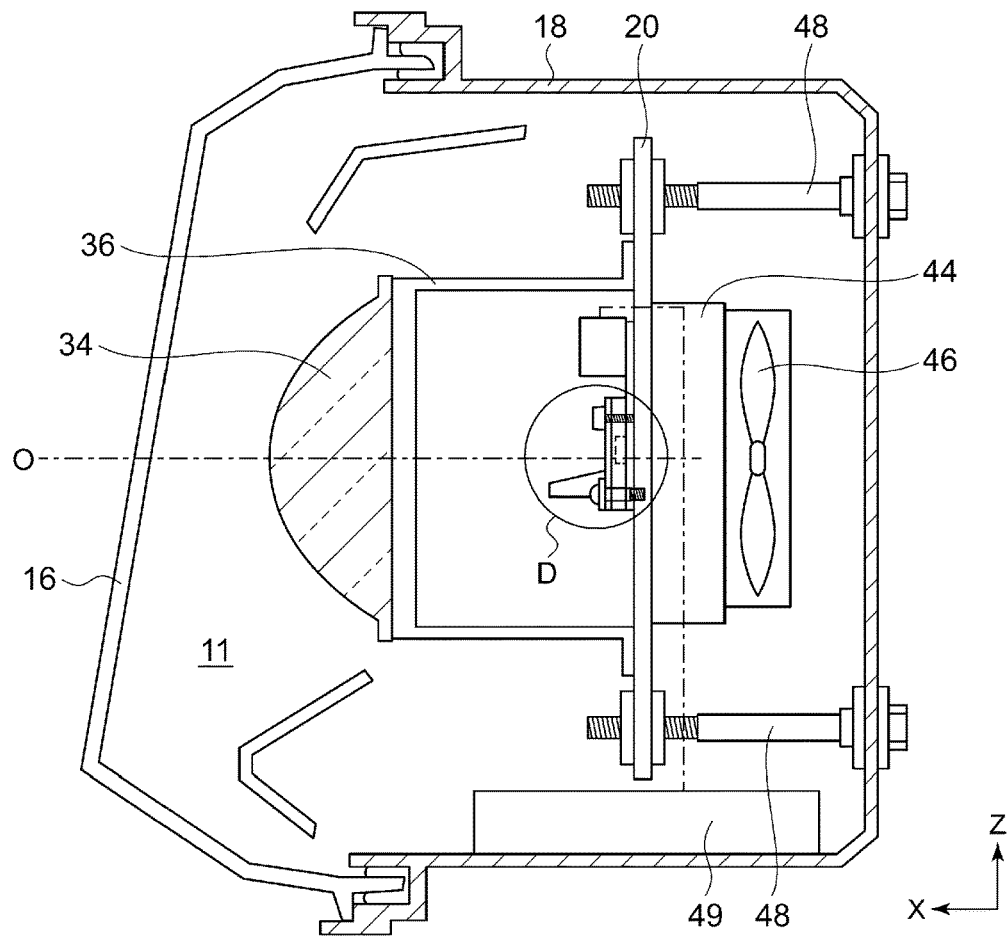
FIG. 3A is a sectional view of a high-beam lamp unit cut along a vertical plane passing through the C-C line.
Figure 3B:
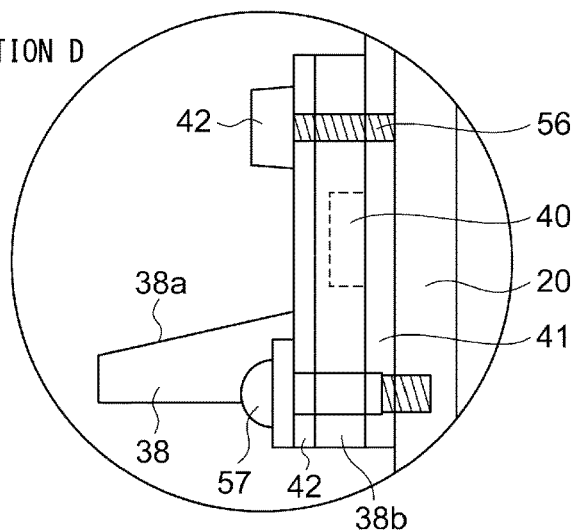
FIG. 3B is an enlarged view of a portion D in FIG. 3A.

FIG. 3A is a sectional view of the high-beam lamp unit 14 cut along a vertical plane passing through the C-C line in FIG. 2. FIG. 3B is an enlarged view of a portion D in FIG. 3A. Hereinafter, the high-beam lamp unit 14 will be described with reference to FIGS. 2 and 3.

The high-beam lamp unit 14 is a lamp unit capable of changing a light-distribution pattern in accordance with the driving condition of the vehicle or the situation surrounding the vehicle. The high-beam lamp unit 14 includes a projection lens 34, a lens holder 36, a reflector 38, and a light-emitting element array 40.

The projection lens 34 is constituted by a plano-convex aspherical lens having a convex front-side surface and a planar back-side surface and projects an inverted image of a light source image formed on the posterior focal plane onto a virtual vertical screen in front of the lamp. The projection lens 34 is attached to one of the openings of the lens holder 36 that is formed into a cylindrical shape.

The light-emitting element array 40 is constituted by a plurality of (eight, in this example) semiconductor light-emitting elements mounted on a substrate 41. The light-emitting elements each have an identical shape and are disposed linearly on the surface of the substrate 41. The light-emitting elements can be turned on/off individually and are configured to be capable of irradiating respective individual irradiation regions, which are obtained by dividing a high-beam light-distribution pattern in the horizontal direction. It is preferable that the individual irradiation region of each light-emitting element at least partially overlap the individual irradiation region of an adjacent light-emitting element (see FIG. 9).

Each of the light-emitting elements includes a light-emitting chip (not illustrated) and a thin film. The light-emitting chip is constituted by a white light-emitting diode having a square light-emitting surface that is approximately 1 mm on each side, for example. It is to be noted that the light-emitting chip is not limited to the above, and the light-emitting chip may be another element-type light source that undergoes substantially point-like surface emission, such as a laser diode. The posterior focal point F of the projection lens 34 may be located on the surface of the light-emitting elements or may be located more toward the front side than the stated surface, as will be described later.

The reflector 38 is disposed below the light-emitting element array 40. As illustrated in FIG. 3B, the reflector 38 has a substantially trapezoidal vertical section and includes a reflection portion 38a that extends in the widthwise direction of the vehicle. The surface of the reflection portion 38a is inclined in a downward direction relative to an optical axis O of the light-emitting element array 40. The reflector 38 will be described further with reference to FIG. 7.

As illustrated in FIG. 3B, a shading plate 42 that blocks a portion of light emitted by the light-emitting element array 40 is provided in front of the light-emitting element array 40. The shading plate 42 will be described further with reference to FIG. 7.

A control unit 49 for controlling on/off of the light-emitting element array 40 is disposed on a bottom surface of the lamp body 18. The control unit 49 detects the position of a vehicle in front or of a pedestrian with a camera (not illustrated) and controls the light-emitting element array 40 so as not to irradiate the individual irradiation region that corresponds to the detected position, thereby achieving the ADB that reduces glare given to the driver of the vehicle in front or to the pedestrian.

The high-beam lamp unit 14 further includes a heat sink 44 provided with a heat-dissipating fin attached to the back-surface side of the support plate 20 and a cooling fan 46.

Inside the lamp room 11, extensions 50, 52, and 54 made of resin are disposed so as to cover the spaces formed between the low-beam lamp unit 12, the high-beam lamp unit 14, and the lamp body 18 and hide the internal structure when the vehicle headlamp 10 is viewed from the front.

Figure 4:
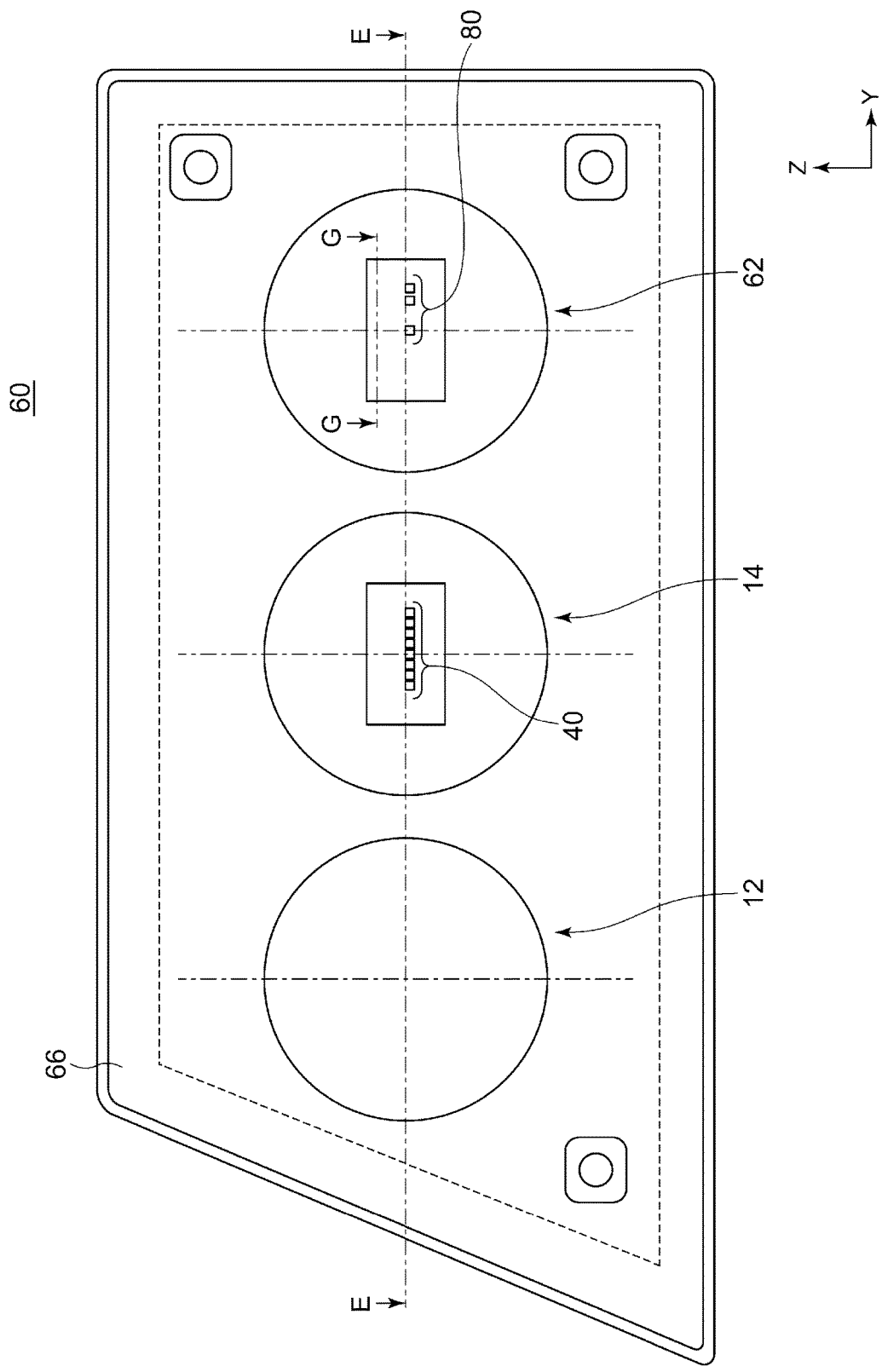
FIG. 4 is a schematic front view of a vehicle headlamp according to another embodiment of the present invention.

FIG. 4 is a schematic front view of a vehicle headlamp 60 according to another embodiment of the present invention. The vehicle headlamp 60 includes a left-side lamp and a right-side lamp provided on the left and right sides, respectively, of the front portion of a vehicle body, but FIG. 4 illustrates only the right-side lamp. The left-side lamp has a configuration similar to that of the right-side lamp except that they are horizontally symmetric, and thus the depiction of the left-side lamp is omitted.

The vehicle headlamp 60 includes a lamp room 61 formed by a lamp body 68 (see FIG. 5A) having an opening toward the front of the vehicle and a transparent or semi-transparent outer cover 66 that covers the opening of the lamp body. A low-beam lamp unit 12, a first high-beam lamp unit 14, and a second high-beam lamp unit 62 are disposed inside the lamp room 61.

In this embodiment, a single high-beam light-distribution pattern is formed by the first and second high-beam lamp units 14 and 62 that each use a light-emitting element array as a light source. The first high-beam lamp unit 14 includes a light-emitting element array 40 constituted by eight light-emitting elements, and the second high-beam lamp unit 62 includes a light-emitting element array 80 constituted by three light-emitting elements.

Figure 6:
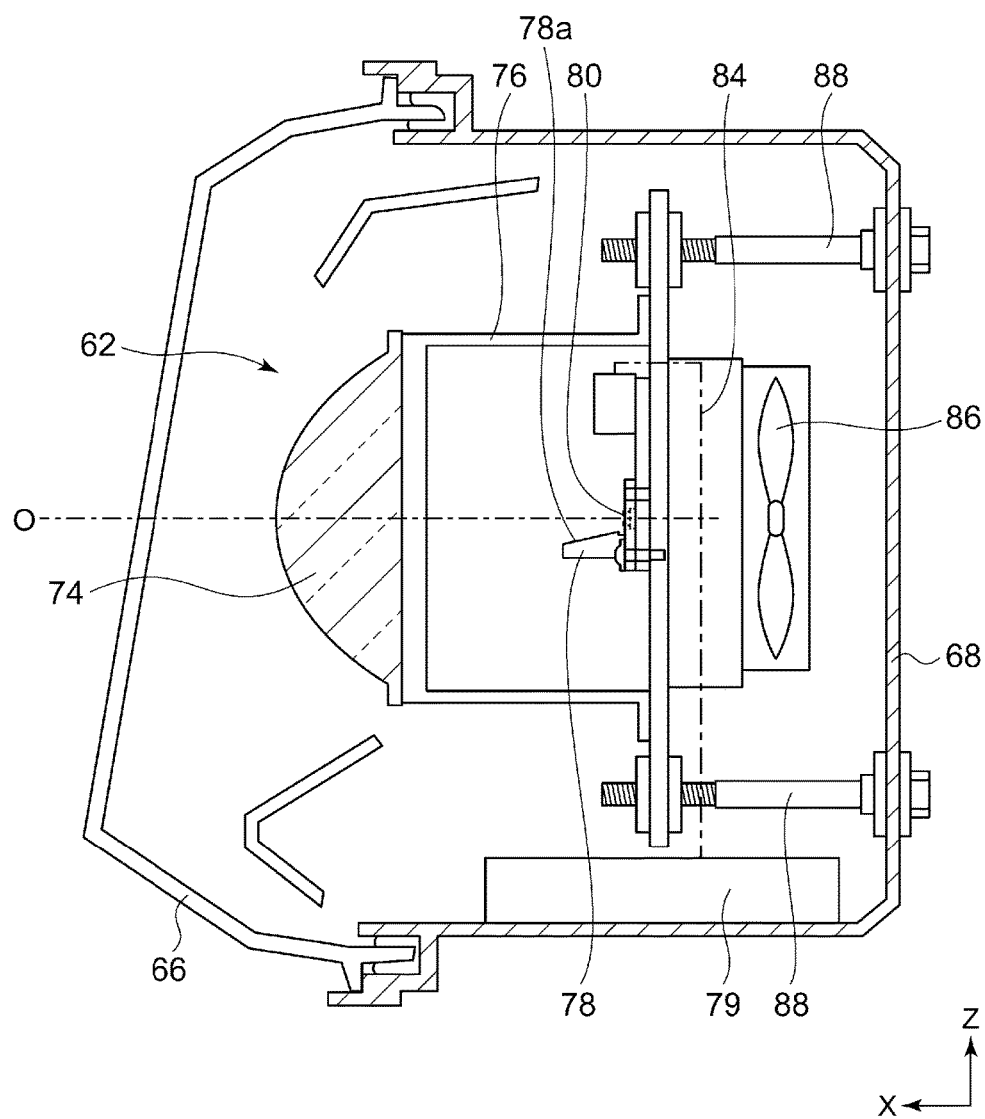
FIG. 6 is a sectional view of the high-beam lamp unit cut along the I-I line.

FIG. 5A is a schematic sectional view of the vehicle headlamp 60 illustrated in FIG. 4 cut along a horizontal plane passing through the E-E line in FIG. 4, and FIG. 5B is a fragmentary sectional view cut along a horizontal plane passing through the G-G line in FIG. 4. FIG. 6 is a sectional view of the high-beam lamp unit 62 cut along the I-I line in FIG. 5A.

The low-beam lamp unit 12, the first high-beam lamp unit 14, and the second high-beam lamp unit 62 are fixed to a common support plate 72. The support plate 72 is fixed to the lamp body 68 with a plurality of (e.g., three) aiming screws 88. Rotating the aiming screws 88 makes it possible to achieve an optical axis adjustment of tilting the optical axes of the three lamp units within a predetermined angular range.

Hereinafter, the high-beam lamp unit 62 will be described with reference to FIGS. 5A, 5B, and 6. It is to be noted that the low-beam lamp unit 12 and the first high-beam lamp unit 14 have configurations similar to those of the low-beam lamp unit 12 and the high-beam lamp unit 14 described with reference to FIGS. 1 through 3, and thus detailed descriptions of the structure of each will be omitted.

The high-beam lamp unit 62 is a lamp unit capable of changing a light-distribution pattern in accordance with the driving condition of the vehicle or the situation surrounding the vehicle. The high-beam lamp unit 62 includes a projection lens 74, a lens holder 76, a reflector 78, and the light-emitting element array 80.

The projection lens 74 is constituted by a plano-convex aspherical lens having a convex front-side surface and a planar back-side surface and projects an inverted image of a light source image formed on the posterior focal plane onto a virtual vertical screen in front of the lamp. The projection lens 74 is attached to one of the openings of the lens holder 76 that is formed into a cylindrical shape.

The light-emitting element array 80 is constituted by a plurality of (three, in this example) semiconductor light-emitting elements disposed on a substrate 81. The light-emitting elements each have an identical shape and are disposed linearly on the surface of the substrate 81. The light-emitting elements can be turned on/off individually and are configured to be capable of irradiating respective individual irradiation regions, which are obtained by dividing a high-beam light-distribution pattern in the horizontal direction. It is preferable that the individual irradiation region of each light-emitting element at least partially overlap the individual irradiation region of an adjacent light-emitting element (see FIG. 9).

Each of the light-emitting elements includes a light-emitting chip (not illustrated) and a thin film. The light-emitting chip is constituted by a white light-emitting diode having a square light-emitting surface that is approximately 1 mm on each side, for example. It is to be noted that the light-emitting chip is not limited to the above, and the light-emitting chip may be another element-type light source that undergoes substantially point-like surface emission, such as a laser diode. The posterior focal point F of the projection lens 74 may be located on the surface of the light-emitting elements or may be located more toward the front side than the stated surface.

The reflector 78 is disposed below the light-emitting element array 80. The reflector 78 has a substantially trapezoidal vertical section and includes a reflection portion 78a that extends in the widthwise direction of the vehicle. The surface of the reflection portion 78a is inclined in a downward direction relative to an optical axis O of the light-emitting element array 80.

As illustrated in FIG. 5B, a shading plate 82 that blocks a portion of light emitted by the light-emitting element array 80 is provided in front of the light-emitting element array 80.

A control unit 79 for controlling on/off of the light-emitting element arrays 40 and 80 of the first and second high-beam lamp units 14 and 62 is disposed on a bottom surface of the lamp body 68. The control unit 79 detects the position of a vehicle in front or of a pedestrian with a camera (not illustrated) and controls the light-emitting element arrays 40 and 80 so as not to irradiate the individual irradiation region that corresponds to the detected position, thereby achieving the ADB that reduces glare given to the driver of the vehicle in front or to the pedestrian.

The high-beam lamp unit 62 further includes a heat sink 84 provided with a heat-dissipating fin attached to the back-surface side of the support plate 72 and a cooling fan 86.

FIG. 7A is an exploded perspective view of the high-beam lamp unit 14. As described above, the high-beam lamp unit 14 includes the projection lens 34, the lens holder 36, the shading plate 42, the reflector 38, the substrate 41, the heat sink 44, and the cooling fan 46.

The projection lens 34 is attached to the front-side opening of the lens holder 36 through laser welding.

The shading plate 42 is constituted by a shading portion 42a that extends in the horizontal direction while bent at two locations so as to project in the front and back direction of the vehicle and two fixing portions 42b that extend downward from respective ends of the shading portion 42a. The fixing portion 42b has a through-hole 42c for fixing and a pin hole 42d for positioning formed therein. The shading portion 42a is located above the light-emitting element array 40 when assembled.

The metal reflector 38 is constituted by a reflection portion 38a that has a trapezoidal section and whose surface is a mirror surface and two fixing portions 38b that extend upward from respective ends of the reflection portion 38a. The fixing portion 38b has a through-hole 38c for fixing and a pin hole 38d for positioning formed therein.

The reflector 38 is disposed in the vicinity of and below the light-emitting element array 40 when assembled. With such a reflector having a planar reflective surface, metal vapor deposition is performed on the reflective surface with ease, as compared to a reflector having a curved shape such as a paraboloid of revolution. In addition, since the vapor deposition can be performed precisely, the reflectance improves, and the utilization factor of a light beam emitted by a light-emitting element array improves as a result. A similar reflector may also be disposed in the vicinity of and above the light-emitting element array 40, and thus the utilization factor of the light beam may be further increased.

It is preferable that the reflector 38 be grounded. This can prevent static electricity from flowing through the light-emitting elements and is effective as a measure against noise.

Two ends of the substrate 41, on which the light-emitting element array 40 is mounted, each have a through-hole 41c for fixing and a pin hole 41d for positioning formed therein. The substrate 41 is also provided with a connector 51 into which a feeder cord for feeding electric power to the light-emitting element array 40 is to be inserted.

The heat sink 44 includes a surface 44a on which the substrate 41 is mounted and a plurality of heat-dissipating fins 44b provided on the surface opposite to the surface 44a. Heat-conductive grease may be applied between the substrate 41 and the surface 44a of the heat sink 44 in order to improve the heat dissipation from the substrate. Two positioning pins 44d (only one of them is illustrated in FIG. 7) that extend in the optical axis direction of the lamp are erected on the surface 44a.

The shading plate 42, the reflector 38, and the substrate 41 are fixed integrally to the surface 44a that is opposite to the heat-dissipating fins of the heat sink 44. The positioning pins 44d erected on the heat sink 44 are inserted into the pin holes 42d, 38d, and 41d of the shading plate 42, the reflector 38, and the substrate 41, respectively, and thus the shading plate 42, the reflector 38, and the substrate 41 can be positioned to the heat sink 44 with accuracy. After the positioning pins 44d are inserted, fixing screws 57 are inserted into the through-holes 42c, 38c, and 41c of the shading plate 42, the reflector 38, and the substrate 41, respectively, and are screwed into threaded holes 44c in the heat sink 44. Thus, the shading plate 42, the reflector 38, and the substrate 41 can be fixed.

In the high-beam lamp unit 14, if the relative position of the light-emitting element array 40 serving as a light source and the reflector 38 and the relative position of the light-emitting element array 40 and the shading plate 42 are not set accurately, this affects the accuracy of a high-beam light-distribution pattern to be formed. As described above, positioning the shading plate 42, the reflector 38, and the substrate 41 all at once with the use of the positioning pins 44d on the heat sink 44 makes it possible to achieve the positioning between the light-emitting element array 40 and the reflector 38 and the positioning between the light-emitting element array 40 and the shading plate 42 with ease.

During daytime, especially, when the sun is high, if the sunlight incident on the projection lens 34 of the high-beam lamp unit 14 hits the lens holder 36 made of resin, the temperature of the lens holder 36 rises, and the holder may melt and be damaged.

Therefore, a shading plate 59 made of metal as illustrated in FIG. 7B may be provided at the position indicated by "K" in FIG. 7A. The shading plate 59 is constituted by a fixing portion 59a that is fixed to the lens holder 36 through thermal caulking and a shading portion 59b that covers the position on the lens holder 36 that is hit by the incident light. The position hit by the incident light differs depending on the angle of incidence of the sunlight, the shape of the projection lens 34, and so on, and thus the position and the shape of the shading portion 59b are set as appropriate on the basis of the result of an experiment or a simulation.

The vehicle headlamp illustrated in FIGS. 4 through 6 includes the first high-beam lamp unit 14 and the second high-beam lamp unit 62 provided at each of the right and left sides on the front of the vehicle body and forms a single high-beam light-distribution pattern by combining the light distributions from these four lamp units.

As described above, the light-emitting element array 40 of the first high-beam lamp unit 14 is constituted by eight light-emitting elements, and the light-emitting element array 80 of the second high-beam lamp unit 62 is constituted by three light-emitting elements. The layouts of the light-emitting elements in the light-emitting element arrays 40 and 80 will be described with reference to FIG. 8.

Figure 8:
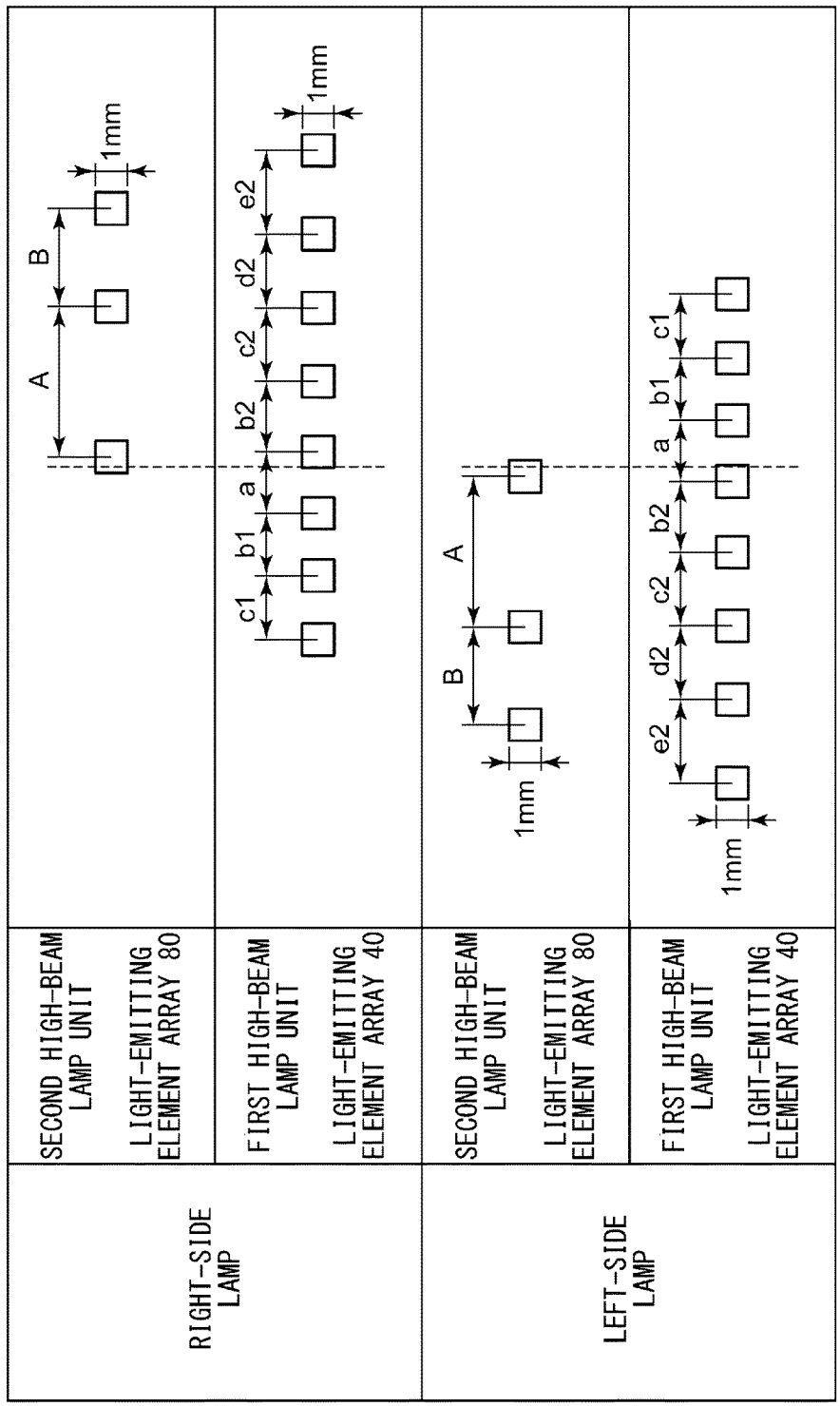
FIG. 8 illustrates exemplary layouts of light-emitting elements in light-emitting element arrays 40 and 80.

The dotted lines in FIG. 8 indicate the center of the projection lens, or in other words, the position of the optical axis.

In each of the light-emitting element arrays 40 and 80, the light-emitting elements are disposed unevenly between the right and left sides with the optical axis of the projection lens serving as the center.

In the light-emitting element array 40 of the first high-beam lamp unit 14, the interval between the light-emitting elements increases as the distance from the optical axis of the projection lens increases. Specifically, for example, in the right-side lamp, the interval between the light-emitting elements increases as in a≤b1≤c1 from the center of the lens toward the left side and increases as in a≤b2≤c2≤d2≤e2 from the center of the lens toward the right side. A relationship opposite to the above holds true in the left-side lamp. In this manner, the light-emitting elements are disposed densely near the optical axis of the lens and disposed more sparsely as the distance from the optical axis increases, and thus the resolution of a high-beam light-distribution pattern around the center thereof can be increased.

In the meantime, in the light-emitting element array 80 of the second high-beam lamp unit 62, one of the light-emitting elements is disposed on the optical axis of the projection lens, and the other two light-emitting elements are disposed side by side at positions spaced apart from the optical axis.

Figure 9A:
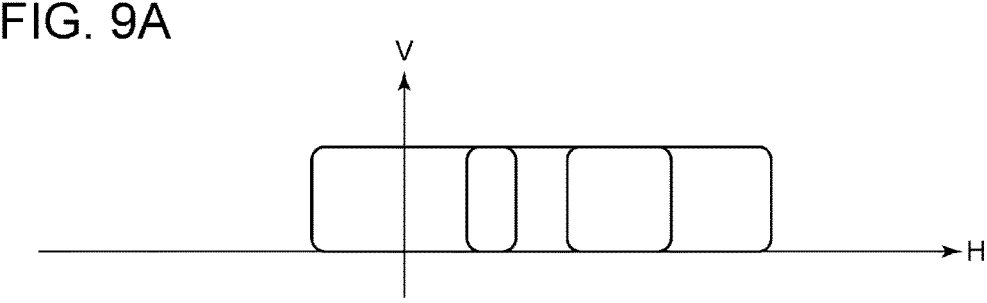
FIG. 9A illustrates individual irradiation regions of the respective light-emitting elements in the light-emitting element array 80.
Figure 9B:
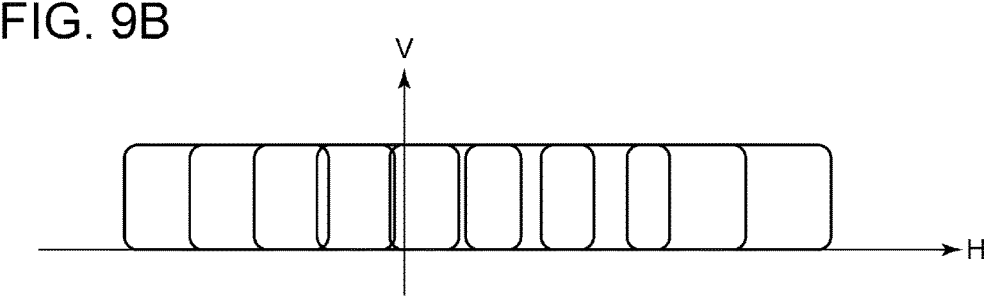
FIG. 9B illustrates individual irradiation regions of the respective light-emitting elements in the light-emitting element array 40.

FIG. 9A illustrates the individual irradiation regions of the light-emitting elements in the light-emitting element array 80, and FIG. 9B illustrates the individual irradiation regions of the light-emitting elements in the light-emitting element array 40. As illustrated in FIG. 9, the individual irradiation regions of the light-emitting element array 40 and the individual irradiation regions of the light-emitting element array 80 of the other lamp unit partially overlap in the horizontal direction. In addition, the individual irradiation regions of the two light-emitting elements disposed at positions spaced apart from the optical axis in the light-emitting element array 80 overlap the individual irradiation regions of the light-emitting element located at an end portion of the light-emitting element array 40.

With the configuration described above, by appropriately selecting the light-emitting elements to be turned on in the light-emitting element arrays 40 and 80, the resolution of a high-beam light-distribution pattern can be improved as compared to a case in which only a single lamp unit is used.

Furthermore, by forming diffused light with one of the lamp units (in this case, the second high-beam lamp unit 62) and by providing the other lamp unit (in this case, the first high-beam lamp unit 14) with a function of condensing light, broad-range diffused light and far-side visibility can both be achieved with the use of a relatively small number of light-emitting elements.

It is to be noted that the number of the light-emitting elements constituting the light-emitting element arrays 40 and 80 is not limited to the above example. A similar effect can be obtained if the number of the light-emitting elements in the lamp unit that is provided with the function of condensing light (the first high-beam lamp unit 14) is set to be greater than the number of the light-emitting elements in the lamp unit that forms the diffused light (the second high-beam lamp unit 62). For example, the former may be five, and the latter may be three.

Now, an improvement of the chromatic aberration of the projection lens will be described with reference to FIG. 10.

Typically, in a lamp unit that uses a light-emitting element array as a light source, when light emitted by a light-emitting element located at an end portion of the array, or in other words, located toward the outside is incident on an upper portion of a projection lens, there arises a problem in that sagging with a blue color occurs at a lower portion of a light-distribution pattern due to the chromatic aberration of the projection lens.

Therefore, in the present embodiment, the shading plate 42 as illustrated in FIG. 7 is provided in the vicinity of the light-emitting element array 40 of the first high-beam lamp unit 14. This shading plate 42 is provided so as to block the trajectory of a light ray connecting the light-emitting element array 40 and the upper end of the projection lens 34.

Figure 10A:
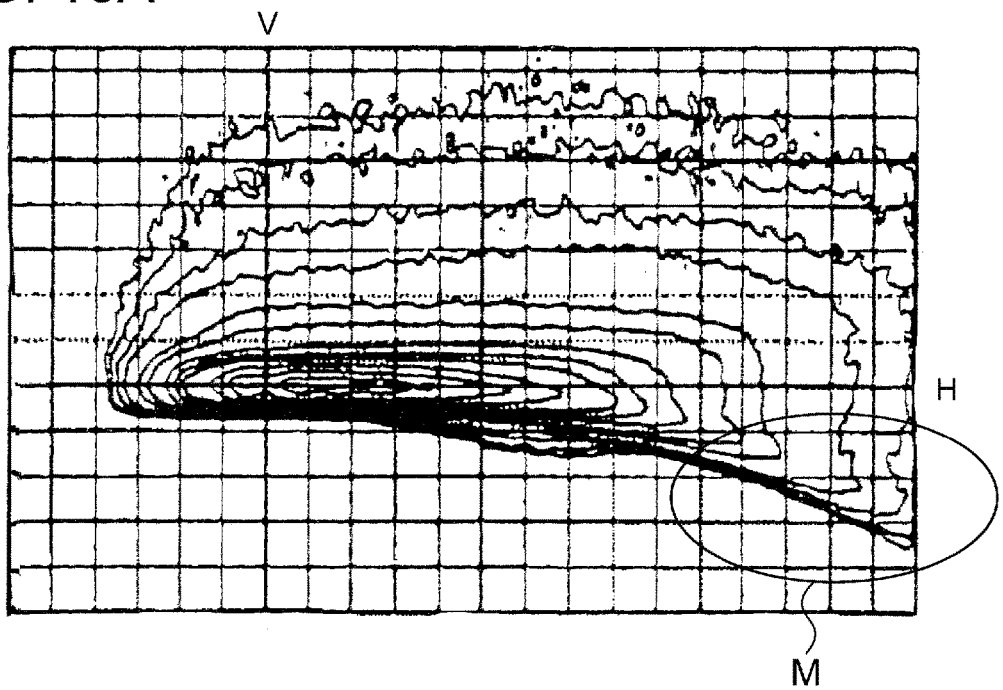
FIG. 10A illustrates a light-distribution pattern formed on a virtual vertical screen when a shading plate is not provided.
Figure 10B:
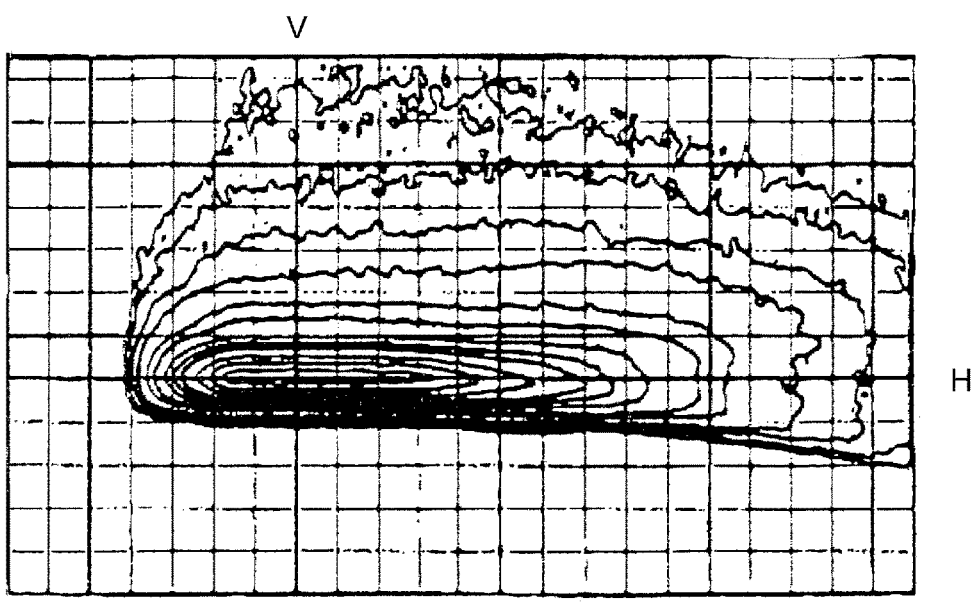
FIG. 10B illustrates a light-distribution pattern when a shading plate is provided.

FIG. 10A illustrates a light-distribution pattern formed on a virtual vertical screen when the shading plate 42 is not provided, and FIG. 10B illustrates a light-distribution pattern when the shading plate 42 is provided. Sagging of the light-distribution pattern arising at the portion indicated by M in FIG. 10A is hardly observed in FIG. 10B. In this manner, blocking a light ray traveling from the end portion of the light-emitting element array toward the upper portion of the projection lens makes it possible to prevent an occurrence of sagging with a blue color arising at the lower portion of the light-distribution pattern. In addition, the upper end of the projection lens does not need to be cut as a measure against aberration, and thus a decrease in the luminous intensity or the luminous flux can be suppressed.

The shading plate 42 illustrated in FIG. 7 includes the shading portion 42a that extends perpendicularly relative to the optical axis, but the shading portion 42a may be provided horizontally as long as the light ray traveling from the end portion of the light-emitting element array 40 toward the upper end of the projection lens 34 can be blocked.

The shading plate 82 illustrated in FIG. 5B is also provided so as to block the trajectory of a light ray connecting the light-emitting element array 80 of the second high-beam lamp unit 62 and the upper end of the projection lens 74 and provides an effect similar to the above.

Now, yet another embodiment of the present invention will be described with reference to FIGS. 11 through 13.

Figure 11A:
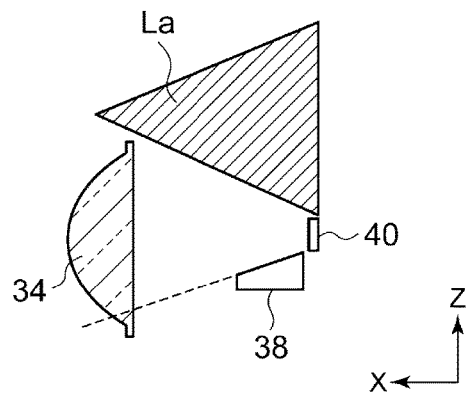
FIGS. 11A and 11B is a schematic diagram illustrating a positional relationship between a projection lens and a light-emitting element array along a vertical section passing through an optical axis of a high-beam lamp unit.

FIG. 11A is a schematic diagram illustrating a positional relationship between the projection lens 34 and the light-emitting element array 40 along a vertical section passing through the optical axis of the high-beam lamp unit 14.

In the embodiment described above, the light-emitting surfaces of the light-emitting element arrays 40 and 80 of the first and second high-beam lamp units 14 and 62 are disposed perpendicularly relative to the optical axis. Normally, a semiconductor light-emitting element, such as an LED, is a Lambertian light source, and thus a light beam emitted toward the outside of a line connecting the light-emitting element array 40 and the upper end of the effective surface of the projection lens 34 (indicated by La in FIG. 11A) is not incident on the projection lens 34 and cannot be utilized, as illustrated in FIG. 11A.

Figure 11B:
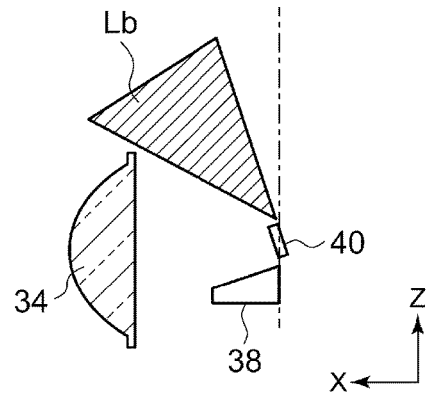

Therefore, it is preferable that the light-emitting surface of the light-emitting element be inclined in a downward direction by inclining the substrate 41 on which the light-emitting element array 40 is mounted in a downward direction (toward the reflector 38) relative to the optical axis of the projection lens, as illustrated in FIG. 11B. This makes the amount of light beam emitted toward the outside of the line connecting the light-emitting element array 40 and the upper end of the effective surface of the projection lens (indicated by Lb in FIG. 11B) smaller than that of La in FIG. 11A, and thus the utilization factor of the light beam can be improved.

In addition, it is preferable that the angle of inclination of the reflective surface of the reflector 38 be set such that the extension line extended from the reflective surface of the reflector 38 toward the front of the vehicle is located in the vicinity of the lower end of the effective surface of the projection lens 34. This allows most of the light emitted downward from the light-emitting element array 40 to be incident on the projection lens 34, and thus the utilization factor of the light beam can be further improved.

Figure 12A:
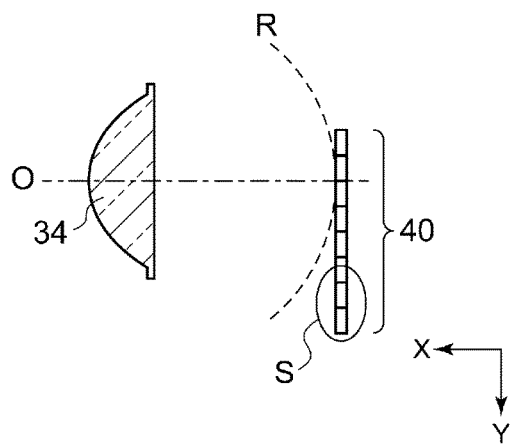
FIG. 12A is a schematic diagram illustrating a positional relationship between a projection lens and a light-emitting element array along a horizontal section passing through an optical axis of a high-beam lamp unit.

FIG. 12A is a schematic diagram illustrating a positional relationship between the projection lens 34 and the light-emitting element array 40 along a horizontal section passing through the optical axis of the high-beam lamp unit 14.

Figure 12B:
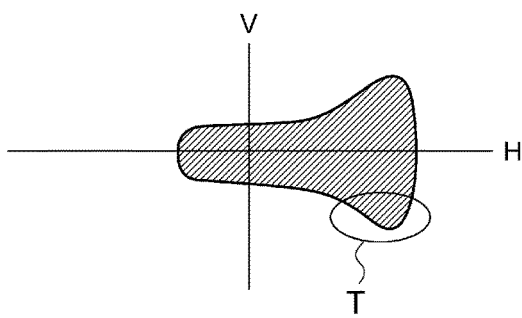
FIG. 12B is a light-distribution pattern formed on the virtual vertical screen by the high-beam lamp unit.

As described above, the light-emitting element array 40 constituted by eight light-emitting elements of the high-beam lamp unit 14 is disposed so as to be offset relative to the optical axis O of the lens. Therefore, in the light-emitting element array 40, a light-emitting element located at a position far from the optical axis O (indicated by S in FIG. 12A) is fairly spaced apart from a virtual image surface of the projection lens 34. Thus, a light-distribution pattern formed on the virtual vertical screen by the high-beam lamp unit 14 has a distorted shape in which one side thereof protrudes in the vertical direction more than the other side does, as illustrated in FIG. 12B. In particular, the portion indicated by T in FIG. 12B is projected in an enlarged manner on the road surface, which gives a sense of discomfort to the driver.

Figure 13A:
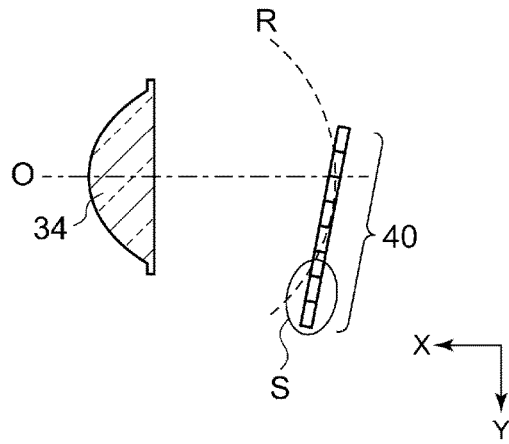
FIG. 13A is a schematic diagram illustrating a positional relationship between a projection lens and a light-emitting element array along a horizontal section passing through an optical axis of a high-beam lamp unit.
Figure 13B:
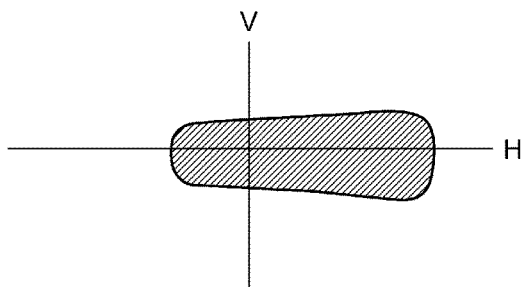
FIG. 13B is a light-distribution pattern formed on the virtual vertical screen by the high-beam lamp unit.

Therefore, it is preferable that, the end portion of the light-emitting element array 40 that is far from the optical axis O be disposed so as to be inclined in the direction of the virtual image surface R, as illustrated in FIG. 13A. This allows the light-emitting element located at a position far from the optical axis O as indicated by S in FIG. 13A to also follow the virtual image surface R, and thus the protrusions of the light-distribution pattern in the vertical direction formed by the high-beam lamp unit 14 are reduced, as illustrated in FIG. 13B, and a light-distribution pattern having a more desirable shape can be obtained. In addition, the light-emitting element near the optical axis becomes closer to the virtual image surface, and thus the brightness of the light-distribution pattern at the center portion thereof improves as well.

Now, still another embodiment of the present invention will be described with reference to FIGS. 14 through 16.

Figure 14:
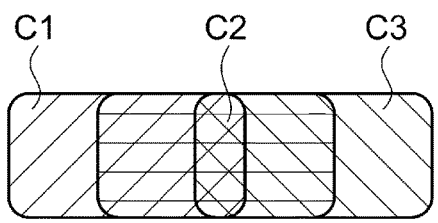
FIG. 14 illustrates exemplary individual irradiation regions on a virtual vertical screen irradiated by respective light-emitting elements constituting a light-emitting element array.

FIG. 14 illustrates exemplary individual irradiation regions on a virtual vertical screen irradiated by light-emitting elements constituting a light-emitting element array. When the individual irradiation regions of adjacent light-emitting elements partially overlap each other on the virtual screen, a problem arises in that optical unevenness or a streak appears between a portion in which two individual irradiation regions overlap and a portion in which three individual irradiation regions overlap, for example.

Figure 15:
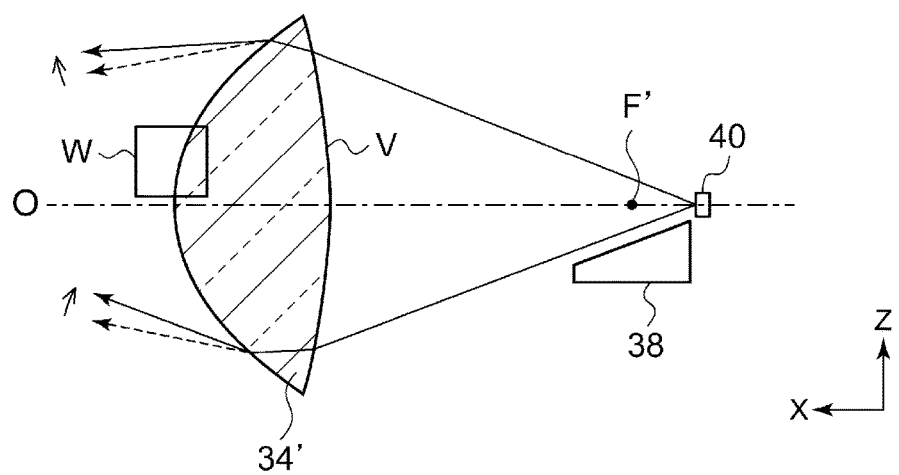
FIG. 15 is a schematic diagram illustrating a positional relationship among a projection lens, a light-emitting element array, and a reflector along a vertical section passing through an optical axis of a high-beam lamp unit.

FIG. 15 is a schematic diagram illustrating a positional relationship among a projection lens 34', the light-emitting element array 40, and the reflector 38 along a vertical section passing through the optical axis of the high-beam lamp unit 14. The projection lens of the embodiment described above is a plano-convex lens having a convex front surface and a planar back surface, but the back surface of the projection lens 34' of the present embodiment also has a convex shape.

Figure 16A:
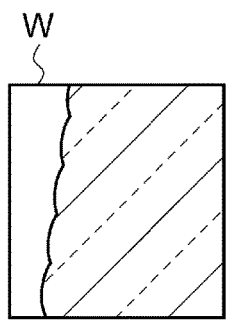
FIGS. 16A through 16C are enlarged views of an exit surface W of a projection lens.
Figure 16B:
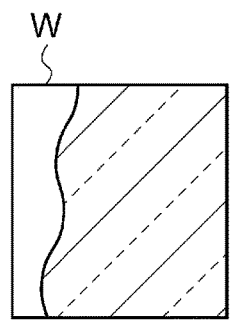
Figure 16C:
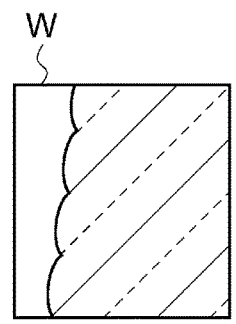

FIG. 16 illustrates enlarged views of an exit surface W of the projection lens 34'. When a diffusing shape that extends in the vertical direction is formed on the exit surface of the projection lens, light incident on an incident surface is diffused in the horizontal direction by the diffusing shape, and thus an occurrence of optical unevenness or a streak in a high-beam light-distribution pattern can be reduced. The diffusing shape that extends in the vertical direction may, for example, be a shape in which a cylindrical convex groove is repeated as illustrated in FIG. 16A, a shape in which a concave groove and a convex groove are repeated as illustrated in FIG. 16B, or a shape in which a convex groove having a curved shape other than an arc shape is repeated as illustrated in FIG. 16C.

The curvature of the projection lens 34' on the incident surface V side may be changed. Referring back to FIG. 15, the dotted lines that extend from the exit surface of the projection lens 34' indicate the trajectory of the exit light before the curvature of the projection lens is changed (i.e., the incident surface is planar), and the solid lines indicate the trajectory of the exit light after the curvature of the projection lens is changed.

For example, the curvature of the incident surface above the optical axis O of the projection lens 34' may be changed, so that the light that exits from the exit surface above the optical axis O is directed upward. This makes it possible to reduce the chromatic aberration and sagging that occur in a lower portion of a high-beam light-distribution pattern. This is an effect similar to that of the shading plate 42 described above.

In addition, the curvature of the incident surface below the optical axis O of the projection lens 34' may be changed, so that the light that exits from the exit surface below the optical axis O is directed upward. This increases the amount of diffused light directed upward in a high-beam light-distribution pattern, and thus a sign located over a street can be illuminated more brightly to increase the visibility.

As illustrated in FIG. 15, the light-emitting element array 40 may be disposed so as to be spaced apart (e.g., 1-3 mm) from a posterior focal point F' of the projection lens 34' toward the rear side of the vehicle. This causes the images of the light-emitting elements formed by the projection lens to be somewhat blurred, and thus optical unevenness in a high-beam light-distribution pattern that could arise due to the presence of a space between the light-emitting elements constituting the light-emitting element array can be reduced.

Figure 17A:
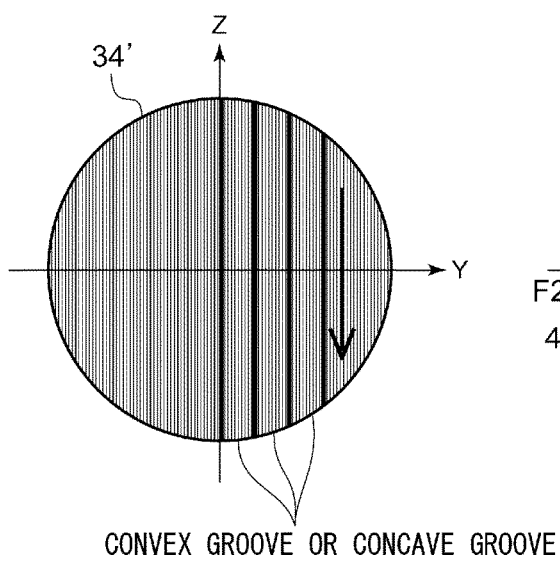
FIGS. 17A and 17B illustrate an embodiment that reduces optical unevenness or streaks in a light-distribution pattern in the vertical direction.
Figure 17B:
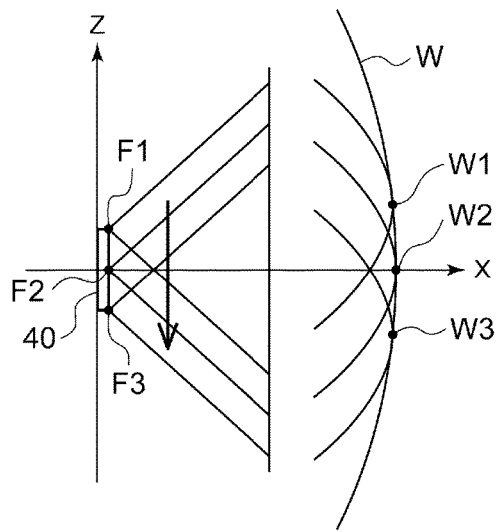

FIGS. 17A and 17B illustrate an embodiment that reduces optical unevenness or streaks in a light-distribution pattern in the vertical direction. First, convex grooves and/or concave grooves such as those illustrated in FIG. 16 that extend in the vertical direction are provided in the exit surface of the projection lens. The shapes of the convex grooves and/or the concave grooves are designed such that the focal points F1 through F3 of the positions W1 through W3 on the exit surface move vertically downward as the positions move vertically downward on the exit surface of the projection lens along the convex grooves and/or the concave grooves. With this configuration, the light emitted by each of the light-emitting elements is more diffused in the vertical direction than in a case in which there is only a single focal point of the projection lens, and thus optical unevenness or a streak in the vertical direction can be reduced.

Furthermore, convex grooves and/or concave grooves that extend in the horizontal direction may be provided in the incident surface or the exit surface of the projection lens. This causes the light emitted by the light-emitting element to be diffused in the vertical direction, and thus optical unevenness or a streak in the vertical direction can be reduced.

It is to be noted that the embodiment described with reference to FIGS. 15 through 17 can also be applied to the projection lens 74 of the second high-beam lamp unit 62.

The present invention is not limited to the embodiments described above. It is also possible to combine the embodiments or to make a modification such as various design changes on the basis of the knowledge of a person skilled in the art, and an embodiment obtained by combining the embodiments or by making a modification is also encompassed by the scope of the present invention. A new embodiment generated by combining the embodiments described above or by combining the embodiments described above with the following modified examples provides effects of the combined embodiments and of the modified examples.

The present embodiment also includes the following configurations.

1. A vehicle headlamp, comprising:
a light-emitting element array in which a plurality of light-emitting elements having respective irradiation ranges that constitute a high-beam light-distribution pattern and configured to be capable of being turned on individually are mounted in array on a substrate;
a projection lens disposed in front of the light-emitting element array; and
a reflector disposed below the light-emitting element array,
the light-emitting elements in the light-emitting element array each being disposed such that the irradiation range thereof partially overlaps the irradiation range of an adjacent light-emitting element,
the projection lens having an incident surface and/or an exit surface provided with a diffusing shape that diffuses exit light from each of the light-emitting elements in a horizontal direction.

2. The vehicle headlamp according to 1 above, wherein the light-emitting element array is disposed so as to be spaced apart from a posterior focal point of the projection lens toward a rear side of a vehicle.

3. The vehicle headlamp according to 1 or 2 above, wherein
the diffusing shape is a convex groove and/or a concave groove that extends in a vertical direction on the incident surface or the exit surface of the projection lens.

4. The vehicle headlamp according to 3 above, wherein
the convex groove and/or the concave groove is formed such that a focal point of each position on a surface moves vertically downward as the position moves vertically downward on the surface of the projection lens along the convex groove and/or the concave groove.

5. The vehicle headlamp according to 3 above, wherein
a convex groove and/or a concave groove that extends in the horizontal direction is provided in the incident surface or the exit surface of the projection lens.

6. A lamp unit, comprising:
a substrate on which a plurality of light-emitting elements configured to be capable of being turned on individually are mounted;
a heat sink disposed on a back surface of the substrate;
a reflector disposed below the plurality of light-emitting elements;
a projection lens disposed in front of the plurality of light-emitting elements; and
a lens holder that holds the projection lens, the heat sink having a pin that extends in an optical axis direction erected thereon, the reflector being positioned to the substrate by inserting the pin into holes opened in the substrate and in the reflector.

7. The lamp unit according to 6 above, wherein the reflector is grounded.

8. The lamp unit according to 6 or 7 above, further comprising:
a shading plate made of metal that prevents incoming light from the projection lens from hitting the lens holder.

DESCRIPTION OF THE REFERENCE NUMERALS

10, 60 vehicle headlamp; 12 low-beam lamp unit; 14 first high-beam lamp unit; 34 projection lens; 36 lens holder; 38 reflector; 40 light-emitting element array; 41 substrate; 42 shading plate; 44*d* positioning pin; 59 shading plate; 62 second high-beam lamp unit; 74 projection lens; 80 light-emitting element array

INDUSTRIAL APPLICABILITY

According to the present invention, the resolution of a high-beam light-distribution pattern around the center thereof can be increased.

What is claimed is:

1. A lamp unit, comprising:
a light-emitting element array composed by a plurality of light-emitting elements, having respective individual irradiation regions constituting a high-beam light-distribution pattern and configured to be capable of being turned on individually, mounted in a row on a substrate;
a projection lens disposed in front of the light-emitting element array; and
a reflector disposed below the light-emitting element array and reflecting light from the light-emitting element array toward the projection lens; wherein:
a spacing between light emitting elements within the light-emitting element array widens the more separated the elements are from the projection lens' optical axis;
the light-emitting element array is disposed such that a light axis of the light-emitting element array passes through the projection lens;
and at least a portion of light from the light-emitting element array is directly incident on the projection lens and at least another portion of light from the light-emitting element array is reflected by the reflector before being incident on the projection lens.

2. The lamp unit according to claim 1, wherein the substrate of the light-emitting element array is disposed such as to incline in a downward direction relative to the projection lens' optical axis.

3. The lamp unit according to claim 1, adopted in a vehicle, wherein the reflector is disposed such as to incline in a downward direction relative to the projection lens' optical axis such that an extension line extending from a surface of the reflector toward the vehicle's front positions in the vicinity of a lower edge of an effective surface of the projection lens.

4. The lamp unit according to claim 1, wherein the light-emitting element array is disposed such as, when viewed from perpendicularly overhead, to align on the projection lens' virtual image surface.

5. The lamp unit according to claim 1, further comprising a shading plate disposed between the light-emitting element array and an upper edge of the projection lens.

6. Vehicle headlamp comprising:
lamp units each according to claim 1, provided on either of right and left sides of a vehicle-body front portion; wherein
in the light-emitting element arrays of the two lamp units, the light-emitting elements are disposed unequally sideways centering on the projection lens' optical axis, and
the individual irradiation regions of the light-emitting element array of one of the lamp units and the individual irradiation regions of the light-emitting element array of the other of the lamp units partially overlap horizontally.

7. The vehicle headlamp according to claim 6, wherein the light-emitting element array of the one of the lamp units includes three light-emitting elements, one of the light-emitting elements being disposed on the projection lens' optical axis, and the other two of the light-emitting elements being disposed such as to have individual irradiation regions that overlap the individual irradiation regions of light-emitting elements located at edge portions of the light-emitting element array of the other of the lamp units.

* * * * *